May 11, 1965  W. L. MILLER ETAL  3,183,291
RIM SHAPING APPARATUS FOR PLASTIC CONTAINERS AND METHOD
Filed July 24, 1961  2 Sheets-Sheet 1
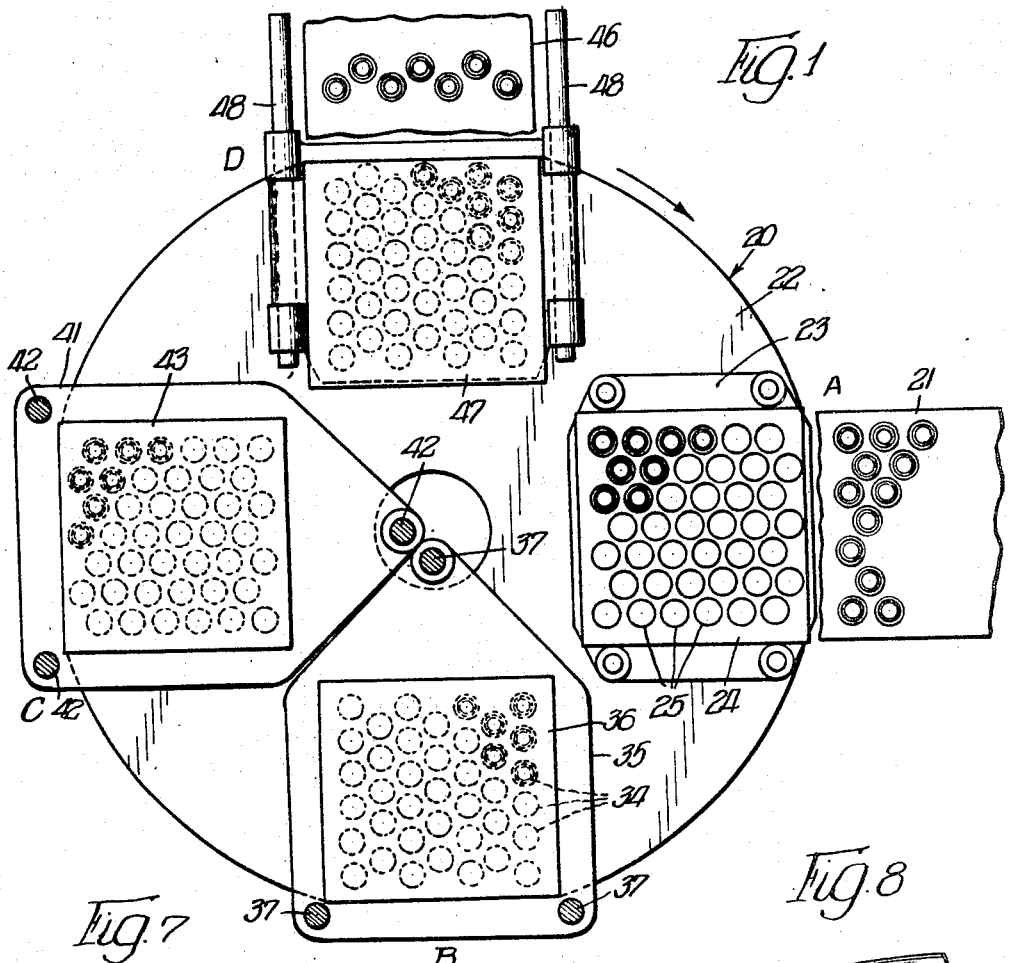
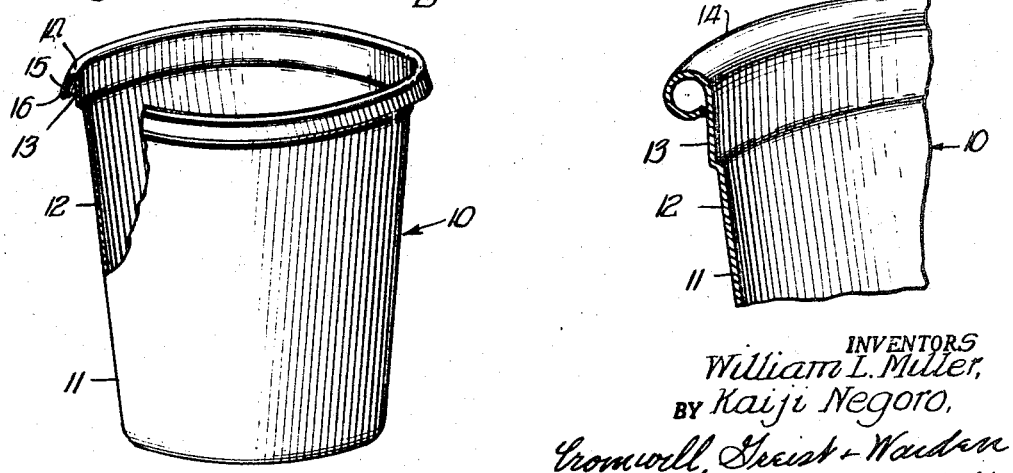
INVENTORS
William L. Miller,
BY Kaiji Negoro,
Cromwell, Greist & Warden
Attys

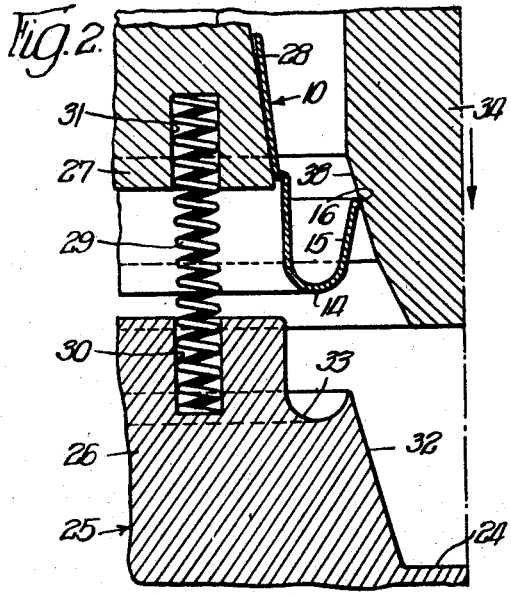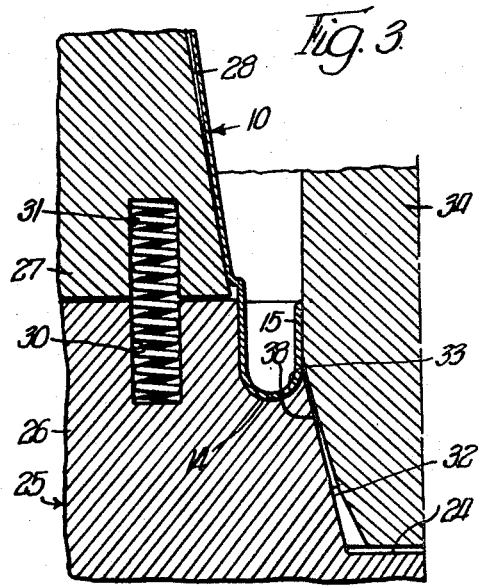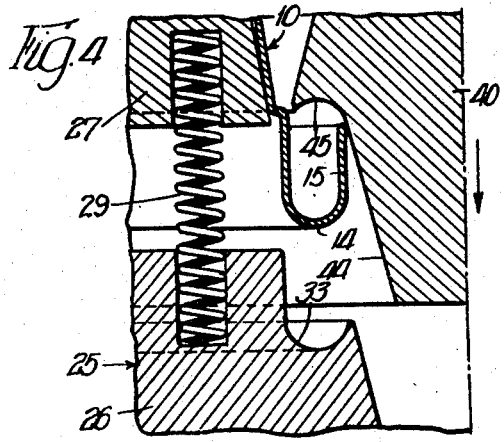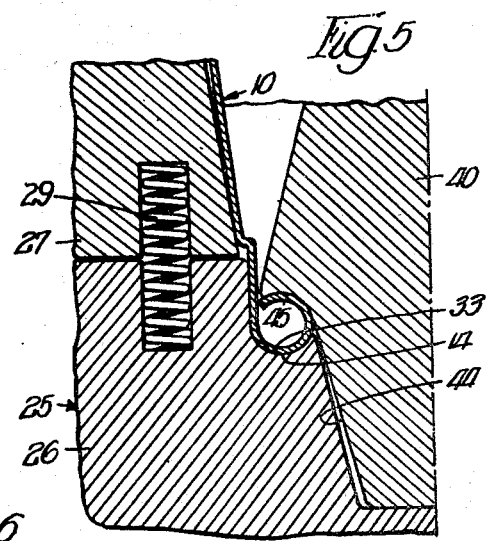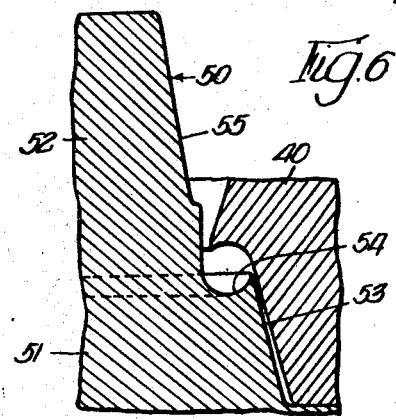

3,183,291
RIM SHAPING APPARATUS FOR PLASTIC CONTAINERS AND METHOD
William L. Miller, Skokie, and Kaiji Negoro, Clarendon Hills, Ill., assignors to Continental Can Company, Inc., New York, N.Y., a corporation of New York
Filed July 24, 1961, Ser. No. 126,186
4 Claims. (Cl. 264—322)

This invention relates to the fabrication of plastic products which are initially formed from a thermoplastic sheet or web by stamping or die shaping operations and subsequently cut or stamped out and is more particularly concerned with improvements in a method and apparatus for applying certain finishing operations to such a product.

Apparatus has heretofore been developed for providing plastic products such as cups or the like by deforming a sheet of heated thermoplastic material into a mold or die member with the cup having a size and shape which is determined by the contour of the mold. Generally, such apparatus employing air pressure or vacuum, or both, causes the heated sheet to take the shape of the cup mold after which the cup is cut from the sheet by trimming around the periphery of the mouth and then stripped from the mold, or the cup is cut from the sheet following the stripping operation. This type apparatus for forming plastic drinking cups and similar containers is illustrated in U.S. patents to Shelby et al. No. 2,967,328, dated January 10, 1961, and Miller No. 2,985,914, dated May 30, 1961, and also in Canadian patent to Thiel No. 604,133, dated August 30, 1960. Machines of the type disclosed in these patents are adapted to produce cups which are capable of being nested so that they may be stacked and which are characterized generally by upwardly tapered side walls terminating in a curled or partially curled rim extending around the periphery of the cup mouth. In order to avoid difficulties in stripping the molded cups from the dies the rim section generally opens in the direction of the bottom of the cup and has a flange-like marginal portion with an outward taper and a sharp edge providing an unfinished appearance.

A principal object of the present invention is to provide a method and apparatus for reshaping or reforming the initially outwardly tapered rim section of a molded plastic cup or like receptacle so as to impart a curl to the marginal portions thereof and form a hollow bead on the rim, thereby improving the appearance and increasing the strength and rigidity thereof.

Another object of the invention is to provide a method and apparatus for forming or shaping the marginal edge portion at the mouth of a formed plastic cup or like receptacle so as to provide a bead thereon having a uniformly rounded contour with the plastic in the bead forming portion being worked at the right temperature conditions so as to be deformed with a minimum of strain in the material and thereby providing a more rigid, stronger and smoother rim structure.

It is a further object of the invention to provide a method and apparatus for forming a bead on the outwardly projecting skirt of a plastic cup or like container in which the forming or curling of the bead is performed in two stages with the bead forming material being heated and shaped by two separate dies which operate successively on the container skirt.

It is still another object of the invention to provide a cup rim shaping apparatus wherein an initially formed cup, with a relatively narrow rim forming outwardly flared skirt portion at its mouth, is supported in inverted relation on a lower die or holder and the outwardly flared skirt portion is shaped or curled into a bead-like formation by first forcing the skirt portion inwardly in the direction of the cup while heating the same and subsequently curling the skirt portion into a bead by means of a descending heated curling die ring which engages the skirt and forces it into a groove having a semi-circular cross section which is provided in the lower die.

It is a further object of the invention to provide in an apparatus for shaping the skirt of a molded plastic cup which comprises a lower die member having the contour of the interior of the cup on which the cup is adapted to be supported with the lip forming section of the cup in an upwardly opening peripheral recess having a semi-circular cross section near the base of the die member and a cooperating curling ring or upper die member mounted for vertical reciprocation and having a curved, downwardly opening recess with a semi-circular cross section in which the skirt of the cup is received and which rolls the same into a bead formation as the curling ring descends with the recess in vertical alignment.

These and other objects and advantages of the invention will be apparent from a consideration of the apparatus which is shown by way of illustration in the drawings, and the method which is hereinafter described.

In the drawings:

FIGURE 1 is a plan view, largely schematic, of a cup rim curling apparatus embodying therein the principal features of the invention;

FIGURE 2 is a vertical sectional view showing a portion of a lower cup holder or supporting die member and a cooperating skirt heating and shaping upper die member for performing the first stage of the shaping or curling operation, the two die members being in a position relative to each other where the upper die initially engages the outwardly flared skirt portion of the cup rim;

FIGURE 3 is a sectional view similar to FIGURE 2 with the die members in the final position at the completion of the first stage of the shaping operation;

FIGURE 4 is a vertical sectional view similar to FIGURE 2 showing the lower cup holder or supporting die member and the upper curling die member which performs the second stage of the curling operation, the cup supporting and shaping die members being in a position relative to each other where the upper or curling die member initially engages the vertically disposed skirt portion of the cup rim;

FIGURE 5 is a vertical sectional view similar to FIGURE 4 with the cup supporting and curling die members in the final position at the completion of the second or curling stage of the shaping operation and prior to the separation of the die members for removal of the cups;

FIGURE 6 is a view similar to FIGURE 5 illustrating a modified form of the cup supporting die member;

FIGURE 7 is a perspective view, with portions broken away, of a molded plastic cup which the present apparatus is adapted to receive; and FIGURE 8 is a fragmentary perspective view to a larger scale showing a rim section of the completely finished or formed cup with portions broken away so as to show the curled rim or bead formation.

Referring to FIGURE 7 of the drawings, there is illustrated a molded plastic cup 10 in the initial unfinished condition in which it is delivered to the lip curling apparatus of the present invention, generally from a cup molding apparatus with which the present apparatus is adapted to be associated. The cup 10 comprises a body section 11 having an upwardly tapered side wall 12 with an outwardly offset inner rim section 13 which is connected by a rounded top edge portion 14 to an outer peripheral flange or skirt portion 15 forming the marginal portion of the cup, which skirt portion is flared outwardly, usually about 15°, from the vertical. In this condition, the skirt portion 15 presents a raw edge 16, resulting from the cutting or trimming of the material during or after the cup is initially formed or molded, which edge has an unfinished appearance, which is generally undesirably sharp and which leaves the rim section of the cup less rigid than desired. Also, the formation of the skirt portion 15 during the molding operation leaves the rim section with a good deal of internal strain particularly at the bend or inner edge of the skirt portion 15, which is undesirable.

The apparatus 20 (FIGURE 1) for reforming or curling the skirt 15 of the cup 10 is particularly adapted to be employed a cup molding machine (not shown) of the type referred to and is designed so as to be positioned at the end of the molding machine, indicated at 21, so as to receive a plurality of the cups 10 as they are discharged from the molding machine of the cups may be discharged onto a conveyor and subsequently delivered to the present apparatus. The apparatus 20 comprises a horizontally disposed, rotatably mounted turret or table 22 on which there is supported a plurality of cup supporting die assemblies as indicated at 23. In the form of the apparatus shown, four of the cup supporting assemblies 23 are positioned in peripherally spaced relation on the rotatable table 22 and the table 22 is mounted for intermittent rotation to position each cup supporting assembly 23 successively at a cup receiving or loading station A, a first stage forming station B, a second stage forming station C, and a finished cup discharge station D.

The cup supporting or holding assemblies 23 (FIGURE 1) each comprise a base member 24 and a plurality of cup supporting die members 25 which may be individually mounted on the base 24 or the supporting die members may be formed integral with the base 24 as a gang assembly of any desired number. The turret 22 may be supported for rotation and powered in any manner and by any suitable mechanism so that its rotation may be timed relative to the operation of the molding machine 21 which delivers a group of initially molded cups to the die members 25 of an assembly 23 positioned at station A.

Each of the cup supporting die members 25 comprises a base portion 26 (FIGURE 2) which is fixed to the assembly base member 24 and an upper cup centering portion or plug member 27 having an upwardly tapered peripheral side wall 28 for receiving in supporting relation a cup 10 thereon. The centering plug member 27 is supported on the base portion 26 by relatively light compression springs 29 which may be seated in vertically aligned pocket forming recesses 30 and 31 on the members 26 and 27, as shown. The two members 26 and 27 may also be slidably connected by one or more guide posts (not shown), or like elements for maintaining the plug 27 in vertical alignment during movement relative to the base portion 26. The base portion 26 has a tapered wall section 32 extending upwardly from the assembly base 24 which terminates at a peripheral groove 33 of half-round section, the groove 33 forming an upwardly opening recess adapted to receive the rounded top edge portion 14 of the inverted cup 10 when the latter is positioned on the centering plug 27 and moved downwardly to seat the rim portion 14 in the groove 33.

When the assembly 23 is loaded with cups the turret plate 22 is rotated to advance the assembly 23 to station B where the first stage of the rim forming operation is accomplished. At station B a plurality of first stage operating rings or members 34 are supported on a frame 35 which is mounted for vertical reciprocation above the path of the table 22 on vertically disposed guide posts 37 or the like. The forming rings 34 may be integral with the base 36 of the frame 35, as indicated, and each of the die rings 34 is heated. The die rings 34 are each provided with an outwardly and downwardly tapered wall section 38 which is of the proper size so that it is adapted to engage the cut edge 16 of the skirt portion 15 on the cup 10 when the ring 34 is lowered over the cup centering plug 27, as illustrated in FIGURE 2. The inward taper on the wall section 38 is approximately the same as the taper on the wall section 32 of the base portion 26 of the cup supporting die. Each of the ring members 34 may be provided with any conventional heating arrangement such as conduits for a heated fluid or electrical resistance units (not shown). Also, the supporting frame 35 for the assembly of the rings 34, which is mounted for vertical reciprocation relative to the table 22, may be provided with any suitable mechanism for moving the same upwardly and downwardly relative to the table 22 when the cup holding assembly 23 is positioned in vertical alignment beneath the forming ring assembly. Any suitable mechanism for reciprocating the frame 35 may be employed and also any suitable guide mechanism may be employed for insuring vertical alignment of the die rings 34 with the cup supporting die members 25. Each die ring 34 continues its movement downward after the tapered surface 38 is engaged with the cup skirt 15 and the plugs 27 with the cup mounted thereon are forced downwardly into the position shown in FIGURE 3 with the cup skirt 15 being heated by contact with the ring surface 38 and being forced inwardly into a vertical position as shown in FIGURE 3 by downward movement of the ring surface 38 when the ring 34 is in the lowermost position. Thereafter the supporting frame 35 is raised to free the assembly 23 for advance from station B to the next station C.

When the first stage of the shaping operation is completed and forming die supporting frame 35 is lifted or retracted, the turret plate 22 is rotated to advance the cup supporting assembly 23 to the third station C where the second stage of the shaping operation is performed. The cups 10 remain on the centering plug members 27 of the supporting die members 25 at the station C with the plugs 27 being elevated by the springs 29 as shown in FIGURE 4 and the second or curling stage of the rim shaping operation is performed by curling rings or die members 40.

The curling rings or die members 40 are supported on a frame 41 which is mounted for vertical reciprocation above the turret table 22 on guide posts 42 at station C. The curling rings 40 are carried on a support or base member 43 which is mounted on the frame 41 and travels in a vertical path with the same. The curling or finishing rings 40 may be integral with the base member 43 as indicated and each is aligned vertically with a cup supporting die member 25 so that it may be lowered over the cup centering plug 27 thereof. Each curling ring member 40 has a downwardly and outwardly tapered surface 44 at its lower edge which terminates at its upper edge at a reversely curved, inwardly extending curling surface 45, the ring being cut away in the areas above the curved surface 45 to provide clearance for vertical movement relative to the centering plug 27. The curved surface 45 provides a curling recess of semi-circular cross section which extends around the ring in vertically spaced, opposed relation to the recess in the cup supporting base member 26. The curling ring 40 is provided with a heating means and proportioned so that as it is lowered by downward movement of its supporting frame 41 the skirt 15 on the cup 10 is engaged by the tapered surface 44 and while in a softened condition from contact with the heated die ring 40, the edge of the skirt 15 is turned inwardly and curled, the edge thereof moving into the curved recess 45 at the top of the tapered surface 44. Continued movement of the die 40 carries the cup 10 and the centering plug 27 downwardly toward the base portion 26 of the cup supporting member 25 so as to seat the rim section 14 of the cup in the recess 33 in the lower die portion 26 as shown in FIGURE 5. The curling ring 40 remains in the down position a very short interval of time and is then retracted by upward movement of its supporting frame 41 which frees the cups on the assembly 23 for advance to station D.

At station D the finished cups are stripped from the centering plugs 27 and transferred to a delivery conveyor 46 by a reciprocating vacuum lift head 47, the latter being mounted on guide rods 48, as shown, or supported for reciprocation in any suitable manner.

A modified form of die member for supporting the cups is illustrated in FIGURE 6. In this form of the apparatus, the cups are carried on a supporting die 50 which comprises a base forming portion 51 and an integral plug or centering member forming portion 52. The base portion 51 has an upwardly opening rim supporting peripherally extending groove or recess 54 at the upper edge of the tapered bottom side wall surface 53 which is of semi-circular cross section. The plug forming section 52 has its outer wall 55 shaped to conform to the interior of the cup 10 and of a size to permit the rim portion 14 of the cup to seat in the recess 54 when the cup is initially deposited on the supporting die member 50. This form of the apparatus is used in the same manner as the principal form which is described.

In using the apparatus the cups 10 are delivered directly to one of the die assemblies 23 on the turret 20 from a molding machine 21, or other supply source, with the cups being inverted and dropped onto the centering plugs 27 where they remain until the rim curling operations are completed. The turret 20 is rotated to bring the loaded assembly from station A to station B where the frame 35 is lowered so as to drop the heated dies 34 down over the plugs 27 as shown in FIGURE 2. The dies 34 descend until the edge 16 of the skirt 15 of each cup engages with a tapered die surface 38. Continued downward movement of the dies 34 forces each cup downward against the action of the springs 29 and moves the skirt 15 inwardly into a vertical plane as shown in FIGURE 3. The frame 35 is then raised leaving the cups 10 on the plugs 27 and clearing the path of the die assembly 23 so that the turret 22 may be indexed to bring the assembly 23 to station C for the second stage curling operation. At station C the supporting frame 41 is lowered so as to drop the heated curling dies 40 over the plugs 27 so as to engage the tapered surfaces 44 with the flanges 15 on the cups as shown in FIGURE 4. Continued descending movement of the dies 40 forces each cup downward to seat the curved rim portion 14 thereof in the groove 33. Thereafter, the dies 40 coil the heated skirt 15 by forcing it inwardly towards the body of the cup and thereby form a bead-like rim portion on the cup as shown in FIGURES 5 and 8. The frame 41 is raised to provide clearance for movement of the assembly from station C to station D where the finished cups are removed from the apparatus.

The dies 34 and 40 are in each case heated to the proper temperature for softening the thermo-plastic material in the cups so that the rim portion may be deformed with a minimum of strain and a bead produced which has a uniformly rounded contour.

We claim:

1. A method of finishing the rim portion of a cup which is initially formed by molding a sheet of thermo-plastic material to provide a cup body having a relatively narrow exterior skirt which extends in the direction of the bottom of the cup, which is outwardly flared and which is connected to the top of the cup body by a portion of semi-circular cross section, which method comprises, engaging the outwardly flared free marginal portions of the skirt with a first heated die ring so as to first soften said marginal portions and then shaping the skirt into a substantially cylindrical section by moving the die ring relative to the skirt, and thereafter curling the cylindrical skirt by engaging the free marginal portions thereof with a curved surface on a second heated die ring and moving the second die ring relative to the skirt so as to produce a smooth finished bead of rounded contour on the cup rim.

2. A method of finishing the rim portion of a cup which is initially formed by molding a sheet of thermoplastic material and which has an exterior skirt which extends in the direction of the bottom of the cup, which is flared outwardly and in the direction of the bottom of the cup and which is connected to the top of the cup body thereof by a portion of semi-circular cross section, which method comprises heating the free marginal portions of the skirt, engaging the heated skirt with a die ring and shaping the skirt into a substantially cylindrical section and thereafter engaging the free marginal portions thereof with a curved surface on the inside of a second die ring and moving the die ring and cup relative to each other along a path coinciding with the vertical axis of the cup so as to cause the same to curl inwardly toward the body of the cup and produce a smooth finished bead of rounded contour on the cup rim.

3. A method of finishing the rim section of a cup-like container which has been initially formed from a thermo-plastic sheet material with the rim section having a rounded top edge and an outwardly flared narrow peripheral skirt extending in the direction of the bottom of the container which method comprises supporting the container in inverted relation on a bottom die member having an upwardly opening groove near the base thereof in which the rounded top edge of the container is seated and curling the skirt inwardly in two stages by engaging the skirt with successive heated die rings which are moved along a path coinciding with the vertical axis of the bottom die member, the first die ring being moved to engage the edge portions of the skirt and progressively force the same a predetermined distance toward the body of the container and the second die ring being moved to engage the edge potrions of the skirt and impart a curl to the skirt in the direction of the body of the container so as to produce a bead of rounded contour.

4. A method of reshaping the rim section of a cup-like container which is characterized by being initially formed from a thermo-plastic sheet material with a rim section having a rounded top edge and an outwardly flared narrow peripheral skirt extending in the direction of the bottom of the container, which method comprises supporting the container in inverted relation on a die member having an upwardly opening groove near the base thereof with the rounded top edge of the container being seated in said groove and reshaping the container skirt in two stages by engaging the skirt with successive heated die rings which are moved toward and from the supporting die member while their long axes are substantially aligned, the skirt being swung in the first forming stage about said top edge a predetermined distance toward the body of the container by engaging it with an inwardly tapered surface on the first die ring and an inward curl being imparted to the free marginal edge portions of the skirt in the second forming stage by engaging the same with the second die ring so as to produce a bear of rounded contour.

References Cited by the Examiner

UNITED STATES PATENTS

| | | | |
|---|---|---|---|
| 488,633 | 12/92 | Paddack | 153—48 |
| 2,114,596 | 4/38 | Franghia | 18—19 |
| 2,218,102 | 10/40 | Van Blarcom | 153—48 |
| 2,272,920 | 2/42 | Merta | 18—19 |
| 2,531,540 | 11/50 | Smith | 18—56 |
| 2,541,905 | 2/51 | Amberg | 153—48 |
| 2,725,597 | 12/55 | Douglas | 18—19 |
| 2,967,328 | 1/61 | Shelby et al. | 18—19 |
| 2,973,558 | 3/61 | Stratton | 18—56 |
| 2,985,914 | 5/61 | Miller | 18—19 |
| 3,096,546 | 7/63 | Edwards | 18—19 |

FOREIGN PATENTS 604,133   8/60   Canada.

ALEXANDER H. BRODMERKEL, *Primary Examiner.*

MORRIS SUSSMAN, *Examiner.*